US012071998B2

(12) United States Patent
Motley et al.

(10) Patent No.: US 12,071,998 B2
(45) Date of Patent: Aug. 27, 2024

(54) CRYOCOOLER ASSEMBLIES AND METHODS

(71) Applicant: Montana Instruments Corporation, Bozeman, MT (US)

(72) Inventors: Jamesen Motley, Bozeman, MT (US); William Baker, Bozeman, MT (US); Josh Doherty, Bozeman, MT (US); Joseph Evers, Bozeman, MT (US); Benjamin Hardesty, Belgrade, MT (US); Anjan Reijnders, Bozeman, MT (US)

(73) Assignee: Montana Instruments Corporation, Bozeman, MT (US)

( * ) Notice: Subject to any disclaimer, the term of this patent is extended or adjusted under 35 U.S.C. 154(b) by 31 days.

(21) Appl. No.: 16/597,655

(22) Filed: Oct. 9, 2019

(65) Prior Publication Data

US 2020/0109763 A1   Apr. 9, 2020

Related U.S. Application Data

(60) Provisional application No. 62/743,482, filed on Oct. 9, 2018.

(51) Int. Cl.
*F16F 15/02* (2006.01)
*F04B 37/08* (2006.01)
(Continued)

(52) U.S. Cl.
CPC ............ *F16F 15/022* (2013.01); *F04B 37/08* (2013.01); *F16F 15/28* (2013.01); *F16F 7/1028* (2013.01)

(58) Field of Classification Search
CPC ........ F16F 15/022; F16F 15/28; F16F 7/1028; F04B 37/08
(Continued)

(56) References Cited

U.S. PATENT DOCUMENTS 2,793,757 A * 5/1957 McWethy ............... D06F 37/24
210/365
3,236,334 A * 2/1966 Wallerstein, Jr. ...... F16F 7/1022
188/380
(Continued)

FOREIGN PATENT DOCUMENTS

CN      103901232      7/2014
CN      107906844 A    4/2018
(Continued)

OTHER PUBLICATIONS

Majorana et al., "Vibration Free Cryostat for cooling suspended mirrors", Journal of Physics: Conference Series 32, (2006), pp. 374-379.

(Continued)

*Primary Examiner* — Melanie Torres Williams
(74) *Attorney, Agent, or Firm* — Wells St. John P.S.

(57) ABSTRACT

Cryocooler assemblies are provided that can include: a first mass configured to generate mechanical responses; a second mass operably engaged with the first mass; and an assembly between the first and second mass, the assembly configured to allow movement of the first mass in relation to the second mass. Methods for isolating mechanical responses within a cryocooler assembly are provided. The methods can include: generating a mechanical response about a first mass within a cryocooler assembly; suspending the first mass in relation to a second mass of the assembly; and operatively engaging the second mass as a cold source for the cryocooler assembly.

7 Claims, 12 Drawing Sheets

(51) Int. Cl.
*F16F 15/28* (2006.01)
*F16F 7/10* (2006.01)

(58) Field of Classification Search
USPC .................................................. 188/378–380
See application file for complete search history.

(56) References Cited

U.S. PATENT DOCUMENTS

| | | | |
|---|---|---|---|
| 3,444,365 A | 5/1969 | Loebe | |
| 3,595,275 A | 7/1971 | Steans et al. | |
| 3,894,403 A | 7/1975 | Longsworth | |
| 3,910,277 A | 10/1975 | Zimmer | |
| 3,929,516 A | 12/1975 | Cheskis et al. | |
| 4,011,732 A | 3/1977 | Doherty et al. | |
| 4,036,617 A | 7/1977 | Leonard et al. | |
| 4,161,747 A | 7/1979 | Jennings | |
| 4,279,127 A | 7/1981 | Longsworth | |
| 4,303,105 A | 12/1981 | Rohner | |
| 4,360,087 A * | 11/1982 | Curwen | F04B 39/0044 188/379 |
| 4,415,184 A | 11/1983 | Stephenson et al. | |
| 4,745,761 A | 5/1988 | Bazaj et al. | |
| 4,757,261 A | 7/1988 | Kneip, Jr. | |
| 4,854,131 A | 8/1989 | Sakitani et al. | |
| 4,869,068 A | 9/1989 | Van Vloten | |
| 4,968,663 A | 11/1990 | Whang | |
| 5,099,650 A * | 3/1992 | Crunkleton | F25B 9/14 60/520 |
| 5,129,232 A | 7/1992 | Minas et al. | |
| 5,148,896 A * | 9/1992 | Ralph | B64C 25/60 188/314 |
| 5,327,733 A | 7/1994 | Boolchand et al. | |
| 5,345,769 A * | 9/1994 | Liepert | F25B 9/14 60/520 |
| 5,349,823 A | 9/1994 | Solomon | |
| 5,410,910 A | 5/1995 | Somlyo et al. | |
| 5,552,608 A | 9/1996 | Gallagher et al. | |
| 5,613,367 A | 3/1997 | Chen | |
| 5,628,195 A | 5/1997 | Hill et al. | |
| 5,647,228 A | 7/1997 | Sager et al. | |
| 5,737,927 A | 4/1998 | Takahashi et al. | |
| 5,749,243 A | 5/1998 | Lester | |
| 5,889,456 A | 3/1999 | Triebe et al. | |
| 5,936,499 A | 8/1999 | Eckels | |
| 5,996,638 A | 12/1999 | Schippl | |
| 6,005,964 A | 12/1999 | Reid et al. | |
| 6,196,005 B1 | 3/2001 | Stautner | |
| 7,430,871 B2 | 10/2008 | Strobel | |
| 7,628,536 B2 | 12/2009 | Umemura | |
| 7,932,733 B2 | 4/2011 | Sasajima et al. | |
| 8,066,429 B2 | 11/2011 | Danley | |
| 8,114,321 B2 | 2/2012 | Johnson | |
| 8,746,008 B1 | 6/2014 | Mauritsen et al. | |
| 8,756,941 B2 | 6/2014 | Snow et al. | |
| 9,134,047 B2 | 9/2015 | Black et al. | |
| 9,243,726 B2 | 1/2016 | Reid et al. | |
| 9,303,914 B2 | 4/2016 | Mauritsen et al. | |
| 9,458,969 B2 | 10/2016 | Prester et al. | |
| 9,618,257 B2 | 4/2017 | Black et al. | |
| 9,620,272 B2 | 4/2017 | Nakayama | |
| 9,821,421 B2 | 11/2017 | Mauritsen et al. | |
| 10,165,667 B1 | 12/2018 | Christiansen et al. | |
| 10,451,529 B2 | 10/2019 | Schreibeis et al. | |
| 10,775,285 B1 | 9/2020 | Baker et al. | |
| 10,785,891 B1 | 9/2020 | Monroe et al. | |
| 11,125,663 B1 | 9/2021 | Henslee et al. | |
| 11,480,299 B1 | 10/2022 | Najafi-Yazdi et al. | |
| 2005/0128187 A1 | 6/2005 | Chen | |
| 2005/0140959 A1 | 6/2005 | Tsuji et al. | |
| 2005/0204748 A1 | 9/2005 | Yamanaka et al. | |
| 2006/0148276 A1 | 7/2006 | Renaudin | |
| 2007/0234751 A1 | 10/2007 | Nagamune | |
| 2007/0271933 A1 * | 11/2007 | Miki | C01B 3/0089 62/51.1 |
| 2007/0278719 A1 | 12/2007 | Adachi et al. | |
| 2008/0315090 A1 | 12/2008 | Nakasuji et al. | |
| 2009/0212890 A1 | 8/2009 | Saho et al. | |
| 2009/0224788 A1 | 9/2009 | Sasajima et al. | |
| 2009/0272127 A1 | 11/2009 | Radovinsky et al. | |
| 2010/0050661 A1 | 3/2010 | Snow et al. | |
| 2011/0219785 A1 | 9/2011 | Black et al. | |
| 2012/0011859 A1 | 1/2012 | Black et al. | |
| 2012/0031110 A1 * | 2/2012 | Tanaka | F25D 19/006 62/51.1 |
| 2013/0047633 A1 | 2/2013 | Leach et al. | |
| 2014/0007596 A1 | 1/2014 | Prester et al. | |
| 2014/0130520 A1 | 5/2014 | Snow et al. | |
| 2014/0202174 A1 | 7/2014 | Wang | |
| 2014/0248649 A1 | 9/2014 | Mayer et al. | |
| 2015/0248002 A1 | 9/2015 | Ingersoll et al. | |
| 2015/0252799 A1 | 9/2015 | Roscher | |
| 2015/0300719 A1 | 10/2015 | Strickland et al. | |
| 2015/0323626 A1 | 11/2015 | Jonas et al. | |
| 2015/0332829 A1 | 11/2015 | Stautner et al. | |
| 2015/0338151 A1 | 11/2015 | Miki | |
| 2017/0168121 A1 | 6/2017 | Yu et al. | |
| 2017/0261413 A1 | 9/2017 | Schreibeis et al. | |
| 2017/0323764 A1 | 11/2017 | Muto et al. | |
| 2019/0025166 A1 | 1/2019 | Schreibeis et al. | |
| 2019/0170621 A1 | 6/2019 | Doherty et al. | |
| 2020/0149686 A1 | 5/2020 | Neils et al. | |
| 2020/0265963 A1 | 8/2020 | Wong | |
| 2021/0278745 A1 | 9/2021 | Groeblacher et al. | |
| 2021/0326739 A1 | 10/2021 | Jeffrey | |
| 2022/0092459 A1 | 3/2022 | Bogorin et al. | |
| 2022/0237495 A1 | 7/2022 | Yohannes et al. | |
| 2023/0155593 A1 | 5/2023 | Abdo et al. | |

FOREIGN PATENT DOCUMENTS

| | | | |
|---|---|---|---|
| DE | 102018130882 A1 | 6/2019 | |
| EP | 0619440 | 10/1994 | |
| FR | 3023900 A1 | 1/2016 | |
| GB | 2457054 A | 8/2009 | |
| GB | 2566024 A | 3/2019 | |
| JP | 05059503 A | 3/1993 | |
| JP | H06-341487 A | 12/1994 | |
| WO | WO-2018168304 A1 * | 9/2018 | F16K 11/074 |
| WO | WO PCT/US2019/55449 | 1/2020 | |
| WO | WO PCT/US2019/55449 | 4/2021 | |

OTHER PUBLICATIONS

Mueller Copper 1100 (Electrolytic Tough Pitch Copper), Alloy Digest, 1983, 2 pages.

Snow, U.S. Appl. No. 61/136,138, filed Aug. 14, 2008, titled "Apparatus(es) & Methods for Improving Vibration Isolation, Thermal Dampening, Optical Access in Cryogenic Refrigerators", 18 pages.

White, G.K., "The Thermal And Electrical Conductivity of Copper At Low Temperatures", 1953, pp. 398-404.

* cited by examiner

CRYOCOOLER ASSEMBLIES AND METHODS

CROSS REFERENCE TO RELATED APPLICATION

This application claims priority to and the benefit of U.S. Provisional Patent Application Ser. No. 62/743,482 filed Oct. 9, 2018, entitled "Cryocooler Assemblies and Methods", the entirety of which is incorporated by reference herein. The entirety of U.S. patent application Ser. No. 16/597,680 filed Oct. 9, 2019, entitled "Cryocooler Assemblies and Methods" is hereby incorporated by reference herein.

TECHNICAL FIELD

The present disclosure provides cryocooler assemblies and methods and in particular embodiments, the present disclosure provides cryocooler assemblies and methods that can be utilized in conjunction with variable temperature analytical instruments such as cryostats.

BACKGROUND

Cryocoolers (a.k.a. "coldhead") have been used to vary the temperature of samples during analysis well into the low Kelvin range of temperatures. During this variation of temperatures, vibrations can exist which can substantially impact the analysis of the sample. The present disclosure provides a cryocooler that, in at least some embodiments, reduces vibrations.

SUMMARY

Cryocooler assemblies are provided that can include: a first mass configured to generate mechanical responses; a second mass operably engaged with the first mass; and an assembly between the first and second mass, the assembly configured to allow movement of the first mass in relation to the second mass.

Methods for isolating mechanical responses within a cryocooler assembly are provided. The methods can include: generating a mechanical response about a first mass within a cryocooler assembly; suspending the first mass in relation to a second mass of the assembly; and operatively engaging the second mass as a cold source for the cryocooler assembly.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
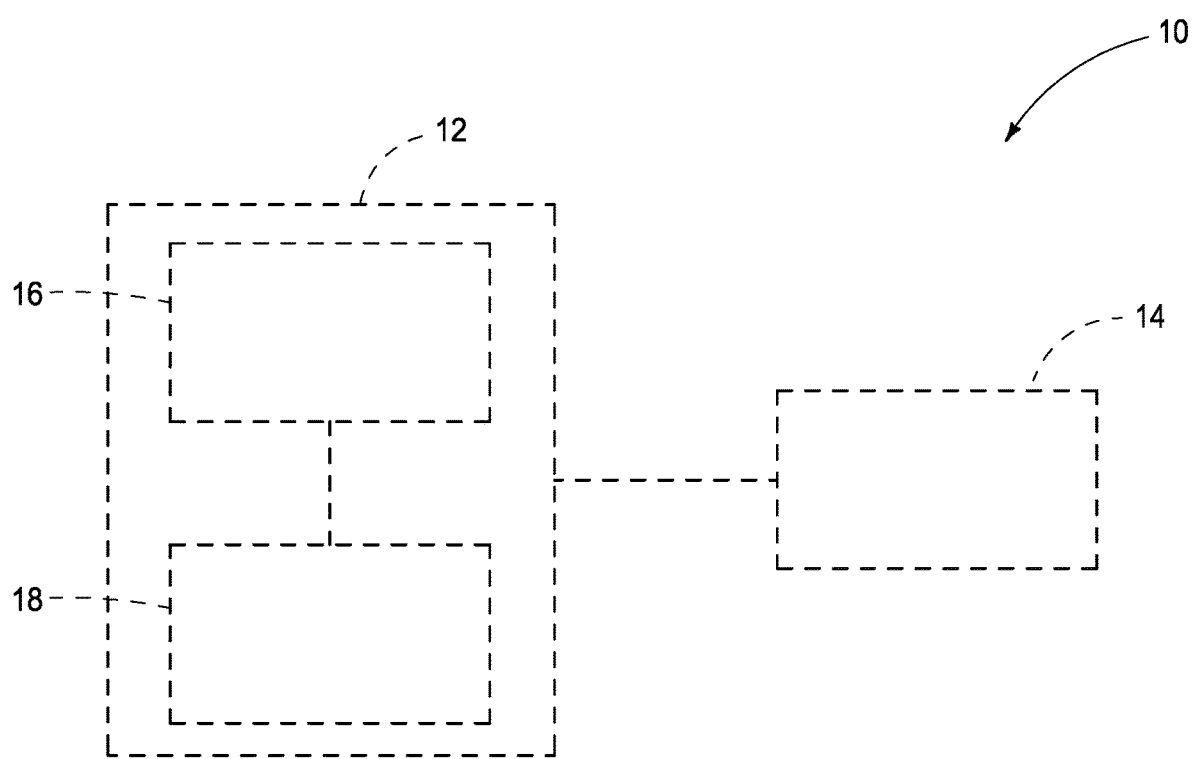
FIG. 1 is a block diagram of an analytical instrument according to an embodiment of the disclosure.

The assemblies and methods of the present disclosure will be described with reference to FIGS. 1-12. Referring first to FIG. 1, analytical instrument 10 is provided that includes a sample chamber 14 in operative communication with a cooling pod 12 that may include both a cooler 16 and a pumphouse 18. While cooling pod 12 is shown housing both cooler 16 and pumphouse 18, this is not necessary, but may be desirable as cooler 16 and pumphouse 18 may be housed separately but operatively coupled to one another and/or to sample chamber 14. In accordance with an example implementation, there can be separation (thermal, vacuum/pressure, and/or physical) of sample chamber 14 from cooler 16. Cooler 16 can include an operational coldhead for example. This is just one example of an instrument or assembly that can benefit from embodiments of this disclosure.

Figure 2:
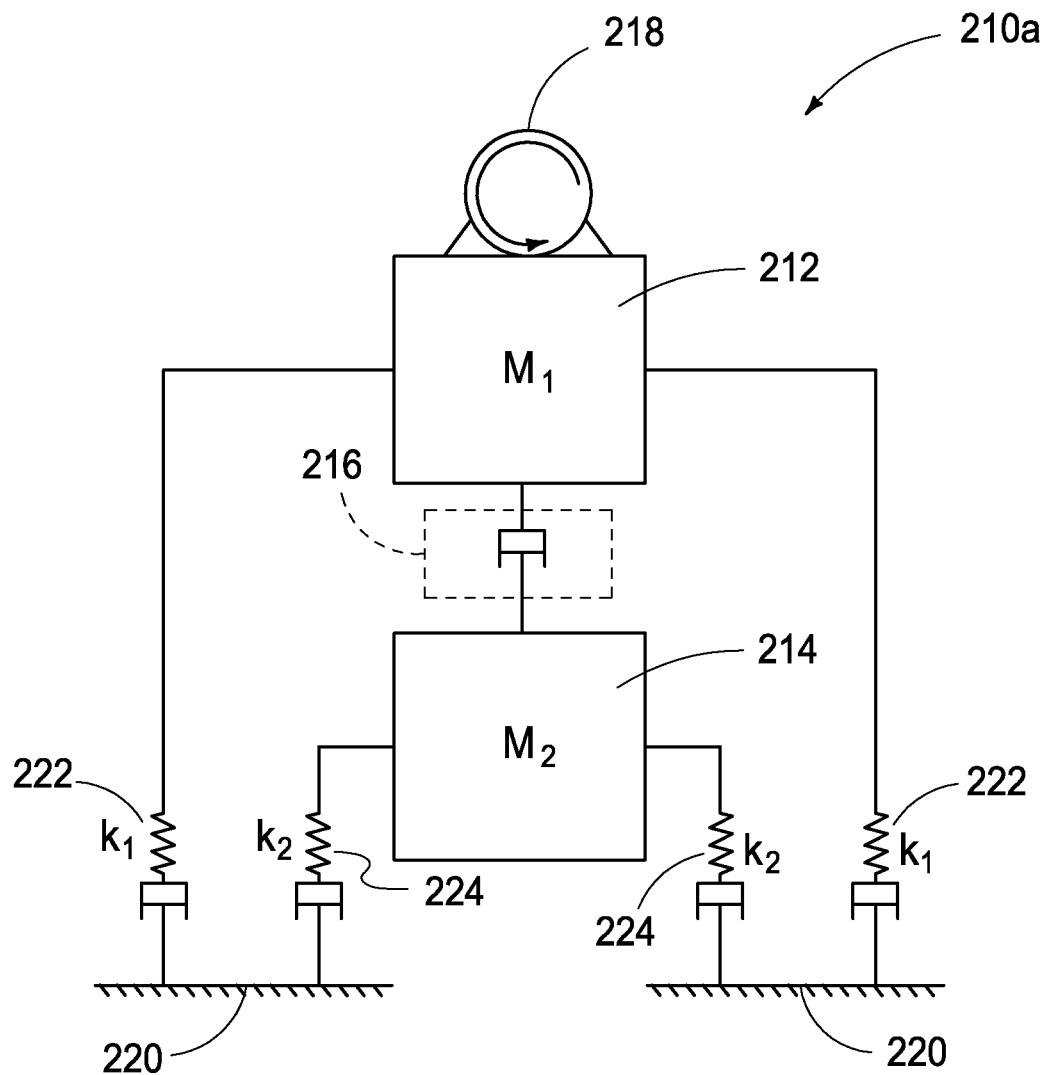
FIG. 2 is a depiction of an assembly/instrument according to an embodiment of the disclosure.

For example, and with reference to FIG. 2, instrument or assembly 210a can include masses 212 and 214 respectively. These masses can be operatively engaged via another assembly 216. In accordance with example implementations, both masses 212 and 214 may be in physical contact with a mounting surface 220 which may be the same or different surfaces. As a part of operating instrument or assembly 210a, a device 218 is engaged that generates mechanical responses, such as vibrations. Device 218 can be a prime mover such as a pump, motor, gas mover, etc. and/or may provide either or both of high or low frequency noise. Mass 212 can be engaged with surface 220 via spring and damper assembly 222. Spring and damper assemblies can include any assembly that includes: only a spring, only a damper, a spring and damper, but can functions to bias one mass in relation to another mass, one mass in relation to a surface, and/or both masses in relation to a surface. Spring and damper assemblies, pressure differences, and/or O-rings and/or assemblies can be utilized to suspend one mass in relation to another mass. The suspending of the masses can allow for motion between the masses in one, more, or all planes while still operatively engaging the masses. As one example, the coldhead motion in relation to the chamber of a cryocooler.

Mass 214 can be engaged with surface 220 via spring and damper assembly 224. The combination of the masses 212 and 214 with possibly different spring and damper assemblies 224 and 222 can provide a low pass filter connection to surface 220. Providing different combinations of masses and springs and dampers can provide for a purposeful mismatch in resonance frequency between masses 212 and 214 as they are engaged by assembly 216. Assembly 216 can include sliding complimentary components engaged by O-rings.

Figure 3:
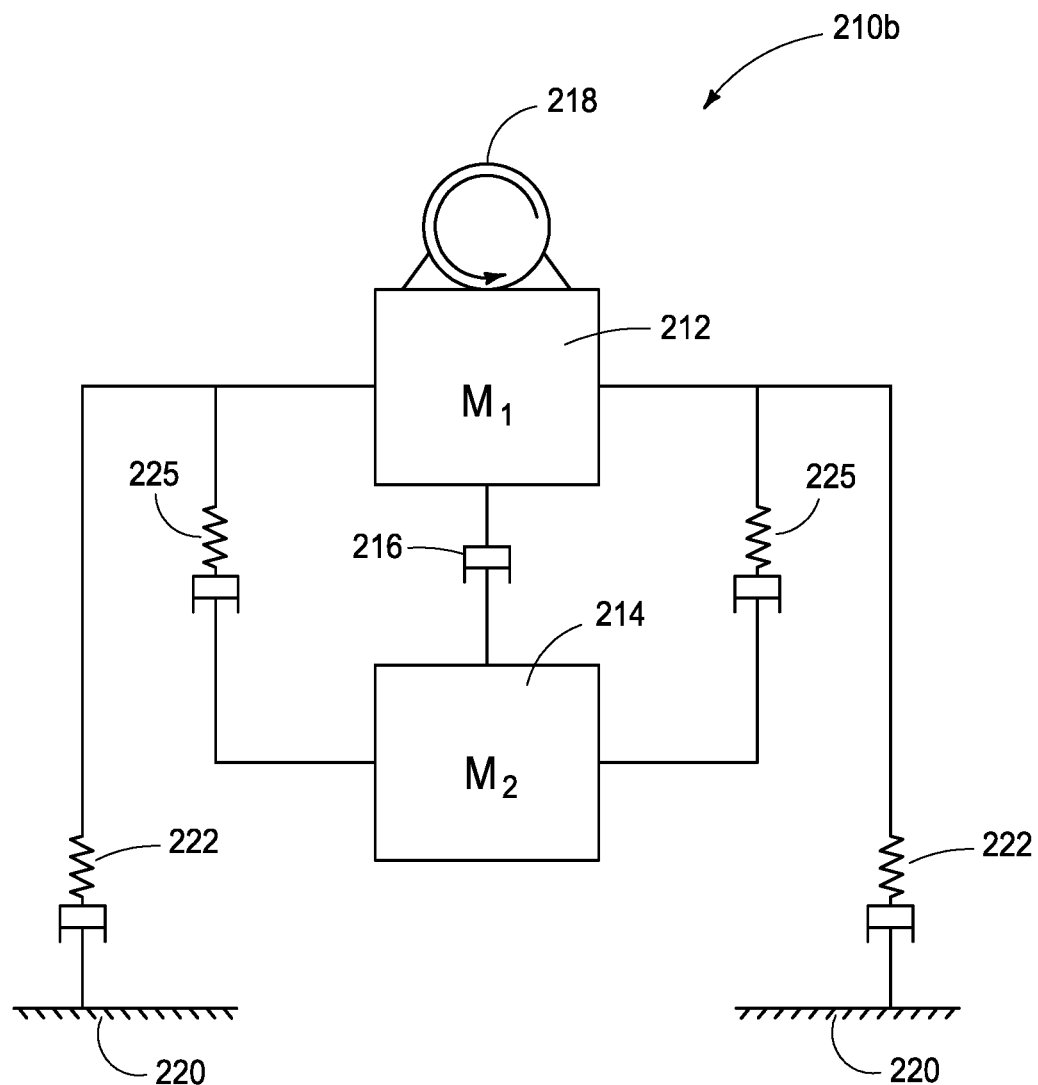
FIG. 3 is a depiction of an assembly/instrument according to another embodiment of the disclosure.

Referring next to FIG. 3, in accordance with an example implementation assembly 210b is depicted to demonstrate only one of masses 212 or 214 in physical contact with a mounting surface 220 with the other mass referenced to it. Mass 212 can be engaged with surface 220 via spring and damper assembly 222 and mass 214 can be engaged with mass 212 via spring and damper assembly 225.

Figure 4:
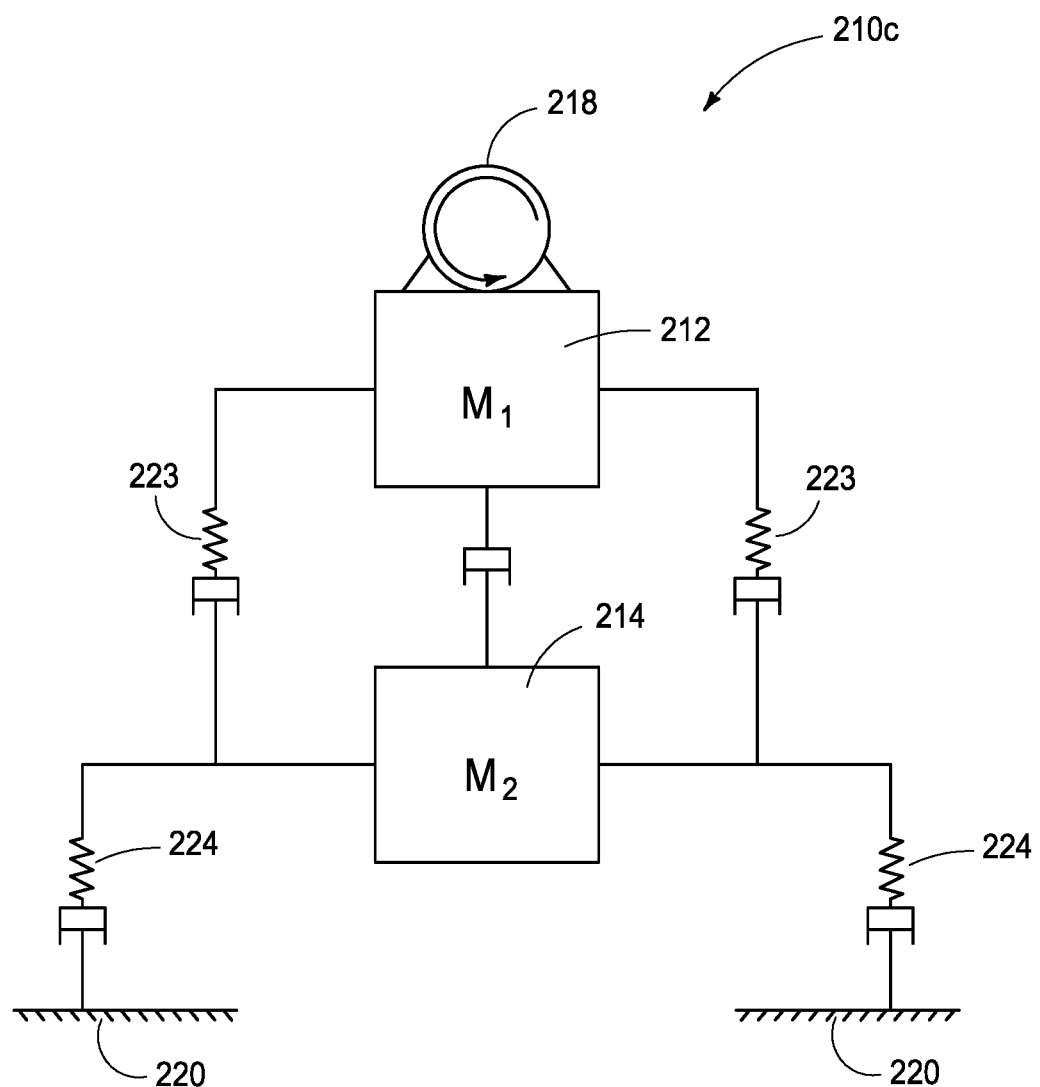
FIG. 4 is a depiction of an assembly/instrument according to another embodiment of the disclosure.

Referring next to FIG. 4, assembly 210c is shown that depicts a demonstration of yet another assembly configuration. Assembly 210c has mass 214 engaged with surface 220 via spring and damper assembly 224 and mass 212 can be engaged with mass 214 via spring and damper assembly 223.

Figure 5:
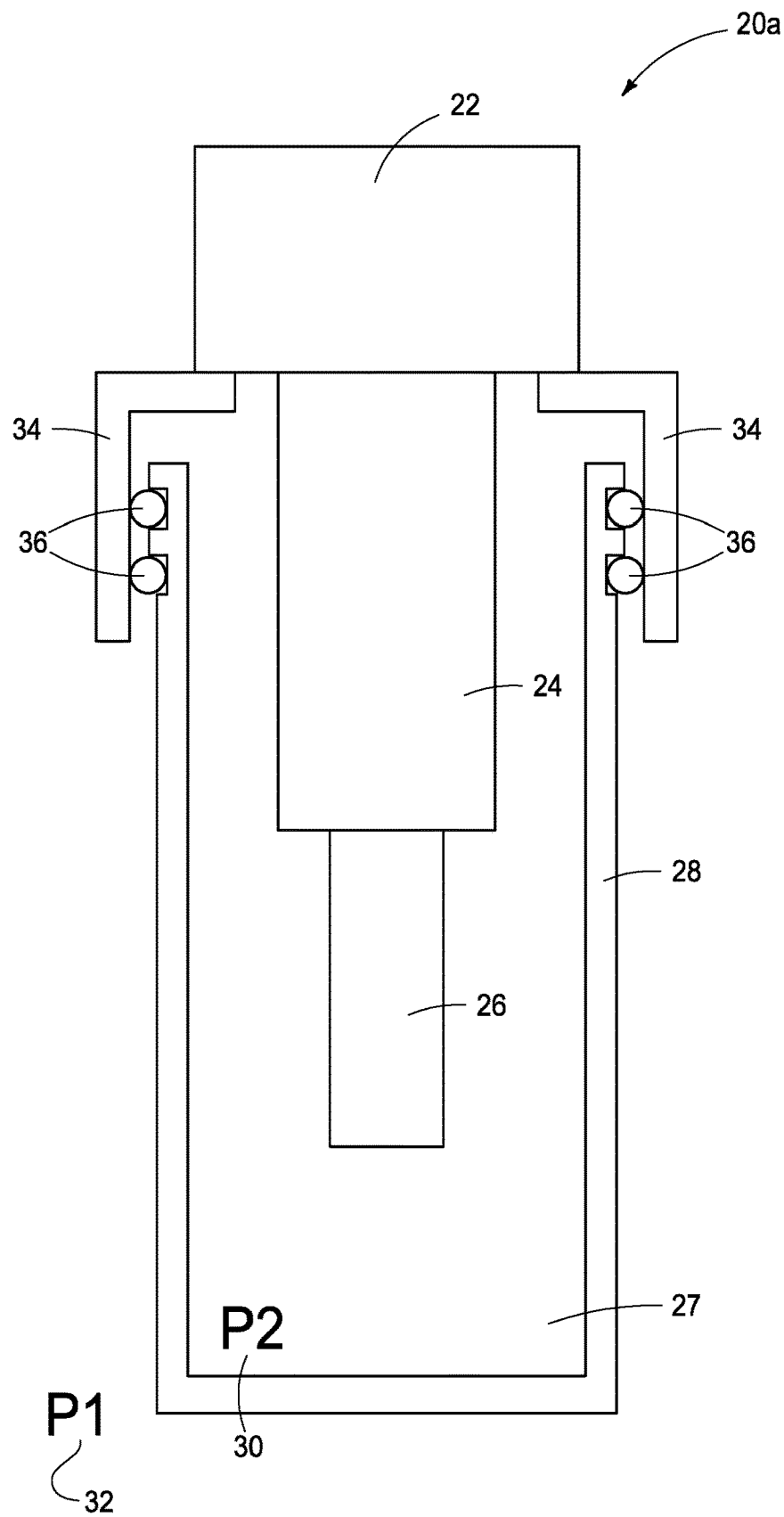
FIG. 5 is a cryocooler according to an embodiment of the disclosure.

In accordance with example implementations cryocooler assemblies 20a-20e are depicted in FIGS. 5-9. Referring first to FIG. 5, a cryocooler assembly 20a is shown that includes a cold head 22 that is arranged as a first stage 24 and second stage 26 coldhead device. Coldhead 22 can be operatively coupled to a compressor system providing coolant fluid such as but not limited to nitrogen and/or helium, for example, or alterations thereof. In accordance with traditional operations, the use of these fluids with the compressor and the coldhead can yield low Kelvin temperatures at the second stage 26 of the coldhead. The coldhead can also be configured to provide a heat sink or cold source that can be linked to one or more masses to remove heat from or provide cooling to the one or more masses.

System 20a can include a chamber 27 that can be maintained at an interior pressure 30 that is substantially different than the exterior pressure 32. This pressure differential can be utilized to provide suspension force on the coldhead 22 within chamber 27 as desired. Accordingly, coldhead support structures 34 can be placed about housing 28 of chamber 27 to provide for a sliding engagement of structures 34 and housing 28, thereby suspending one mass in relation to another mass Residing between housing 28 and coldhead support structures 34 can be a sealing structure 36 such as an O-ring or dual O-ring assembly. Sealing structure 36 can have improved functionality when compared to other implementations such as a rigid tube or bellows connection. For example, high resonance frequencies can be more effectively attenuated in all directions and modes (X-Y-Z translations, tip, tilt, and torsion between bodies 34 and 28) ultimately resulting in less mechanical energy transfer to body 28 and a lower resonance frequency of body 28.

Figure 6:
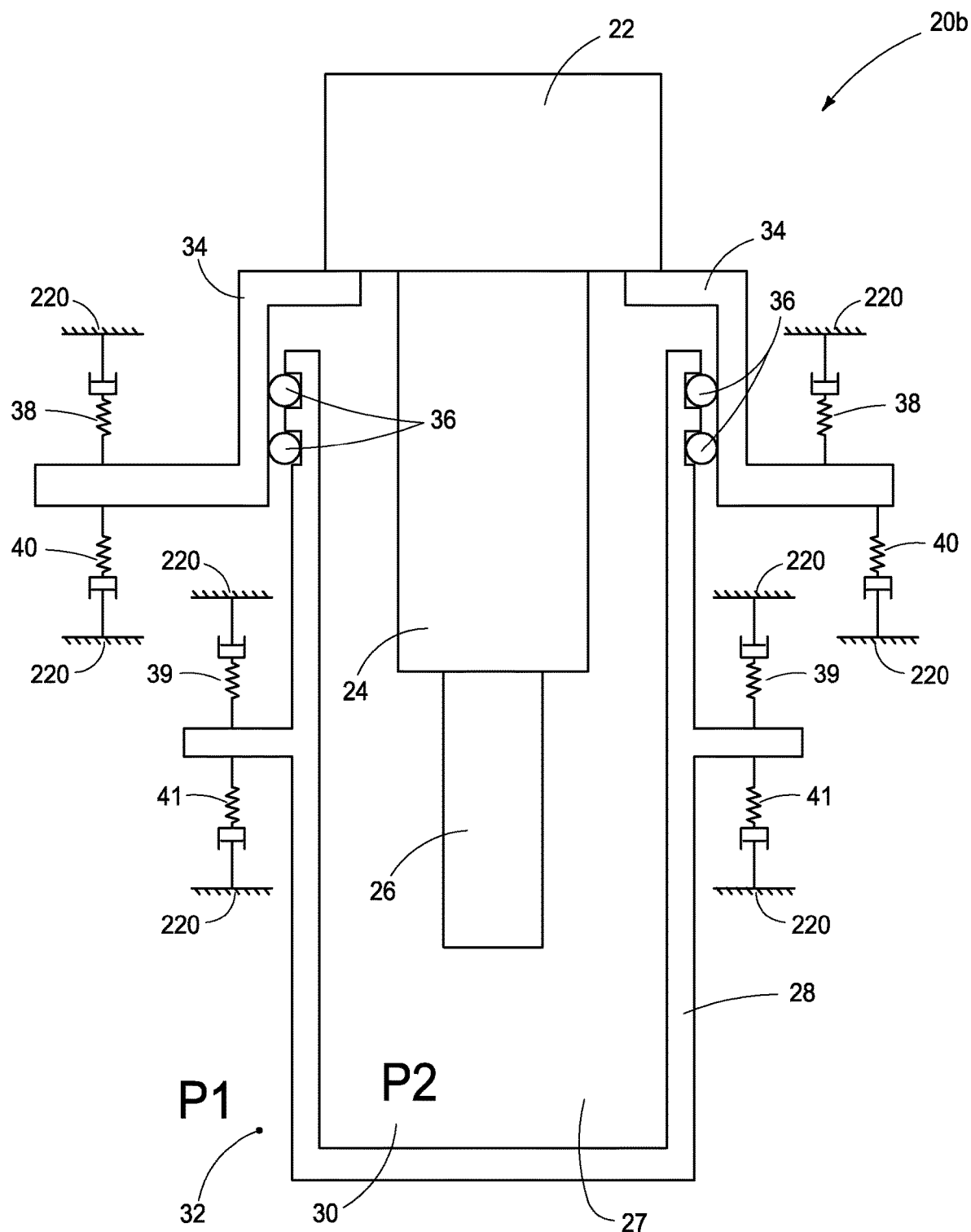
FIG. 6 is a cryocooler according to another embodiment of the disclosure.

Referring to FIG. 6, assembly 20b is depicted that includes spring and damper assemblies 38-41 that are arranged according to an embodiment of the disclosure. In combination, sealing structure 36 and assemblies 38 and 40 can maintain the pressure differential between the interior and exterior volumes, but also provide a damping of vibrations generated about the coldhead thus limiting the vibrations extending to a sample that is supported by a mass which is coupled to the coldhead. Accordingly, support structure 34 can include upper spring and lower spring and damper assemblies 38 and 40, and coldhead 22 can be mechanically insulated from housing 28. These spring and damper assemblies 38 and 40, as well as other spring and damper assemblies can be tuned specifically to attenuate vibration transfer from the coldhead and coldhead support to the rest of instrument, including surface 220 to which the spring and dampers 38 and 40 are mounted. Also, the combined system of spring and damper assemblies 38 and 40 along with the coldhead mass can be purposefully de-tuned from the housing 28 mass and the spring and damper assemblies thus reducing the transmission of vibration from the coldhead to the housing 28 when mounted on common surface 220. For example, housing 28 can include upper spring and damper assembly 39 and lower spring and damper assembly 41 that can be tuned specifically, according to the mass and resonant frequency of the chamber, to reduce the vibrations of the chamber.

Figure 7:
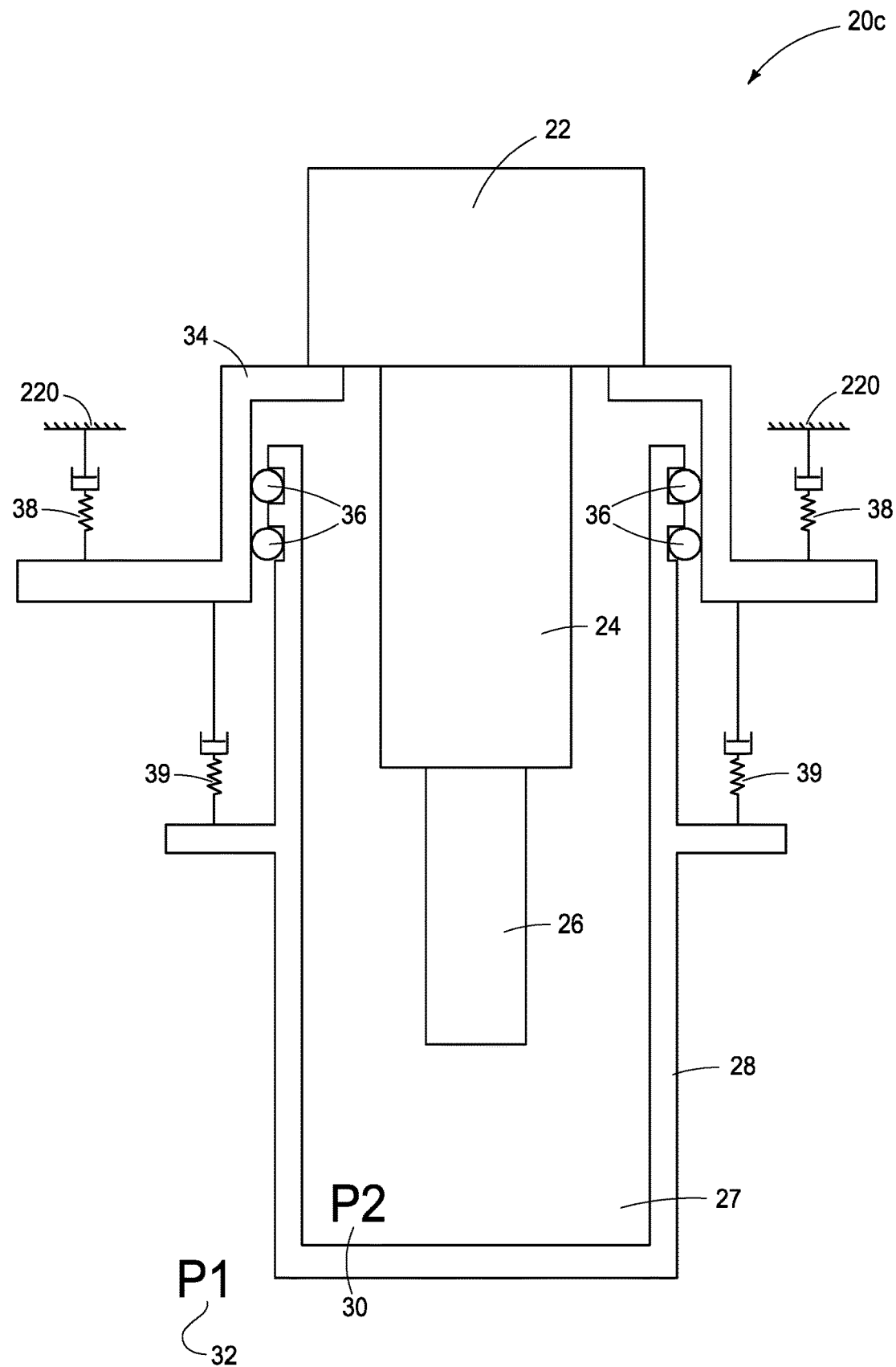
FIG. 7 is a cryocooler according to another embodiment of the disclosure.
Figure 8:
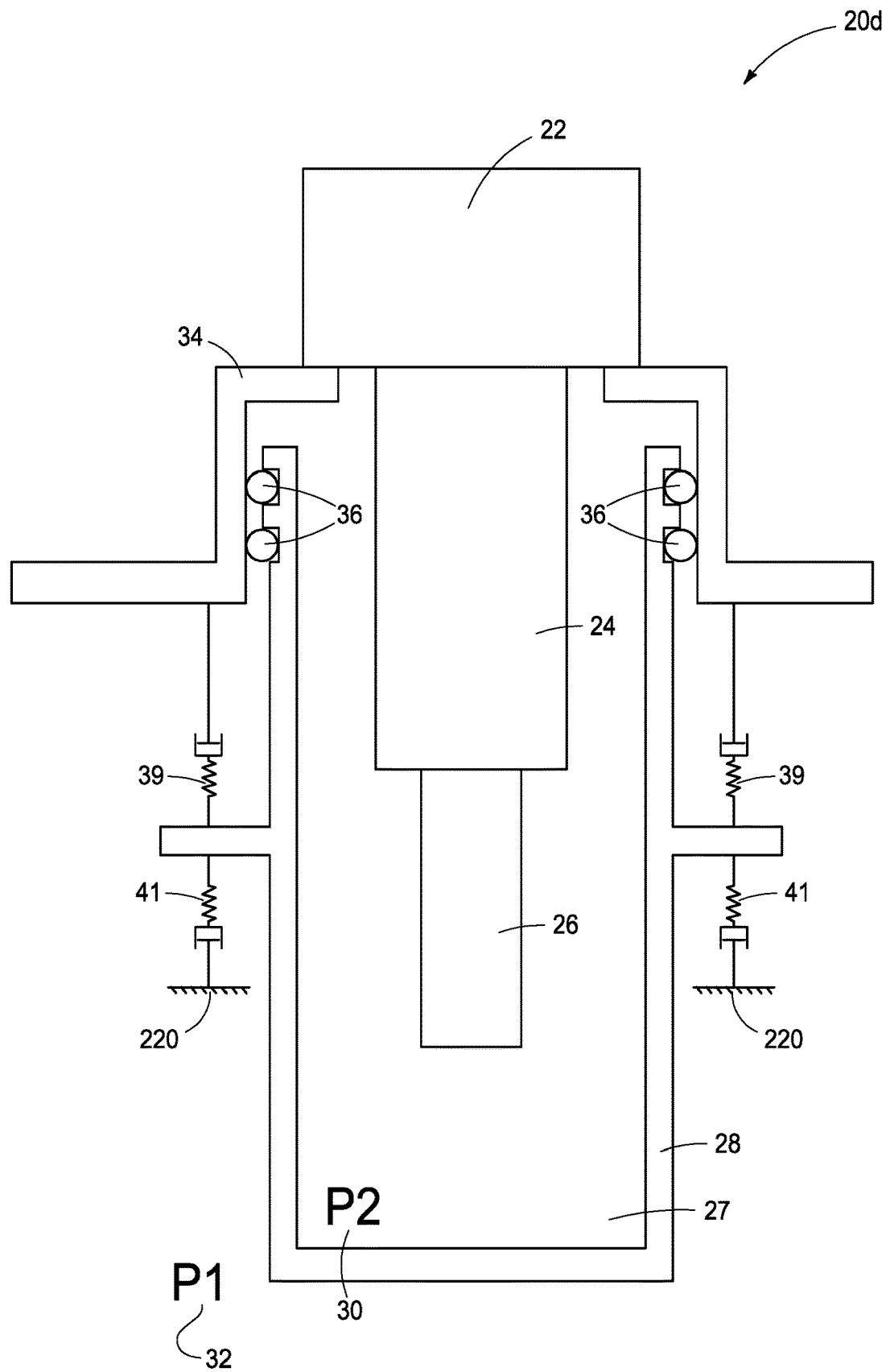
FIG. 8 is a cryocooler according to another embodiment of the disclosure.
Figure 9:
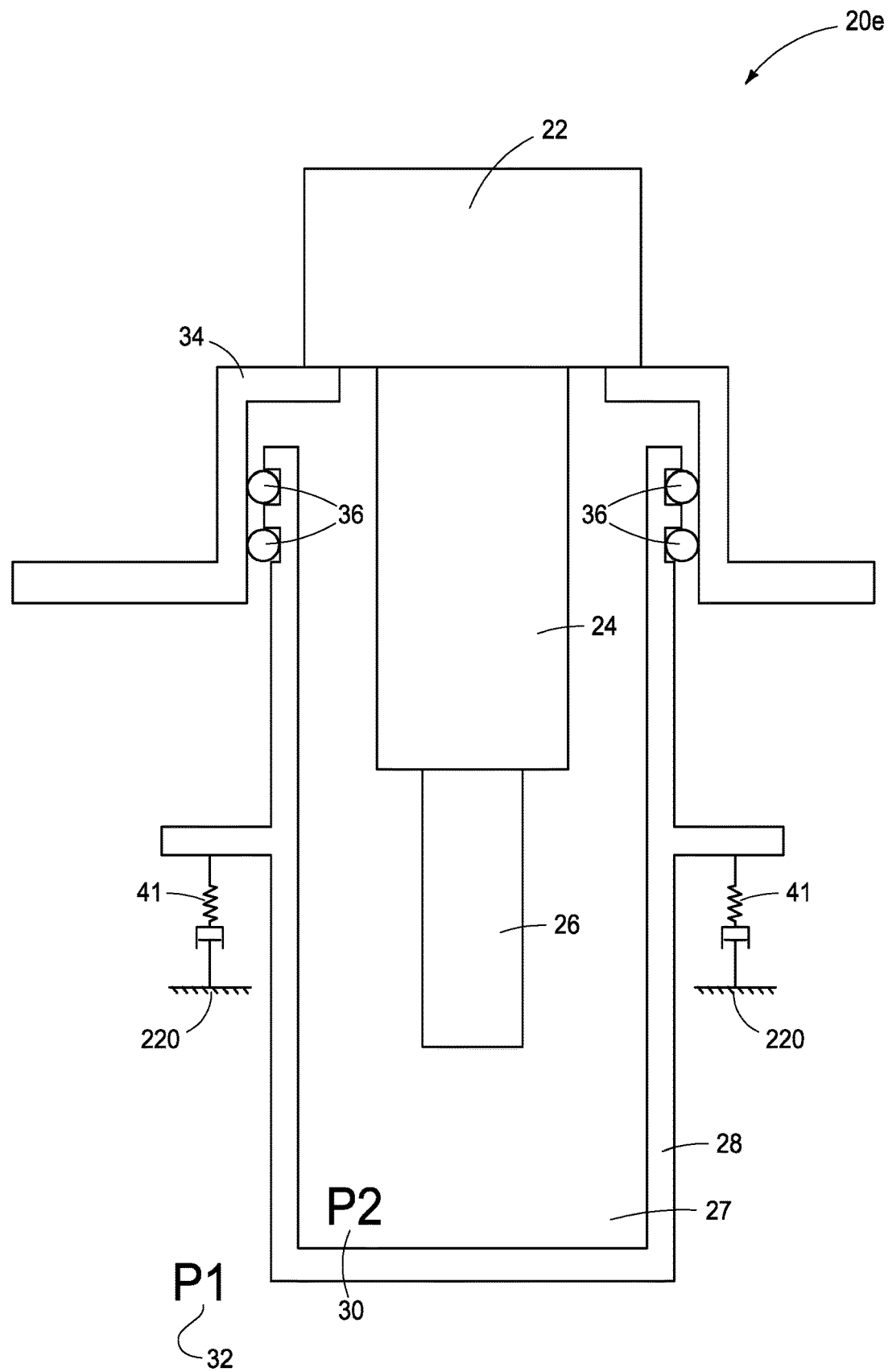
FIG. 9 is a cryocooler according to another embodiment of the disclosure.

Referring to FIG. 7, assembly 20c depicts another configuration that provides for the spring and damper assemblies 39 mounted between the housing 28 and support structure 34 that is operatively engaged with surface 220 via spring and damper assemblies 38. Referring to FIG. 8, assembly 20d depicts another configuration having spring and damper assemblies 39 operatively engaged between support structure 34 and housing 28. Housing 28 may also have spring and damper assemblies 41 operatively engaged with surface 220. Referring to FIG. 9, assembly 20e depicts another configuration without a spring and damper assembly engagement to support structure 34. Assembly 20e can rely on the pressure differential between interior pressure 30 and exterior pressure 32 to support the mass of coldhead 22 and support structure 34. Accordingly, only housing 28 may be operably engaged with the surface 220 via spring and damper assemblies 41 in this specific embodiment.

In accordance with example implementations, coldhead 22 and supports 34 of FIGS. 5-9 can correspond to mass 212 of FIGS. 2-4, and housing 28 of FIGS. 5-9 can correspond to mass 214 of FIGS. 2-4. The arrangement of spring and damper assemblies can likewise correspond according to example implementations.

Figure 10:
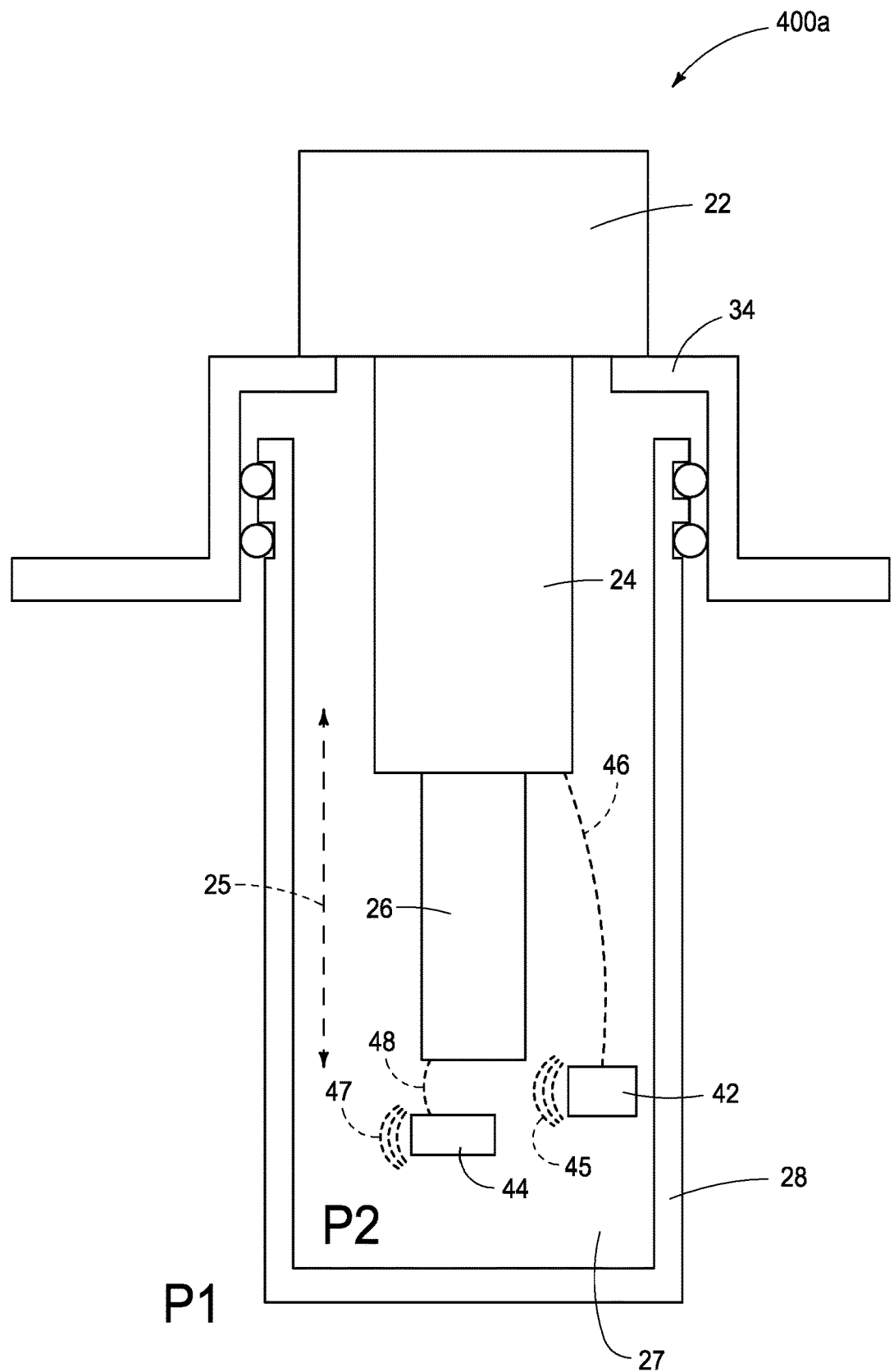
FIG. 10 is a cryocooler according to another embodiment of the disclosure.
Figure 11:
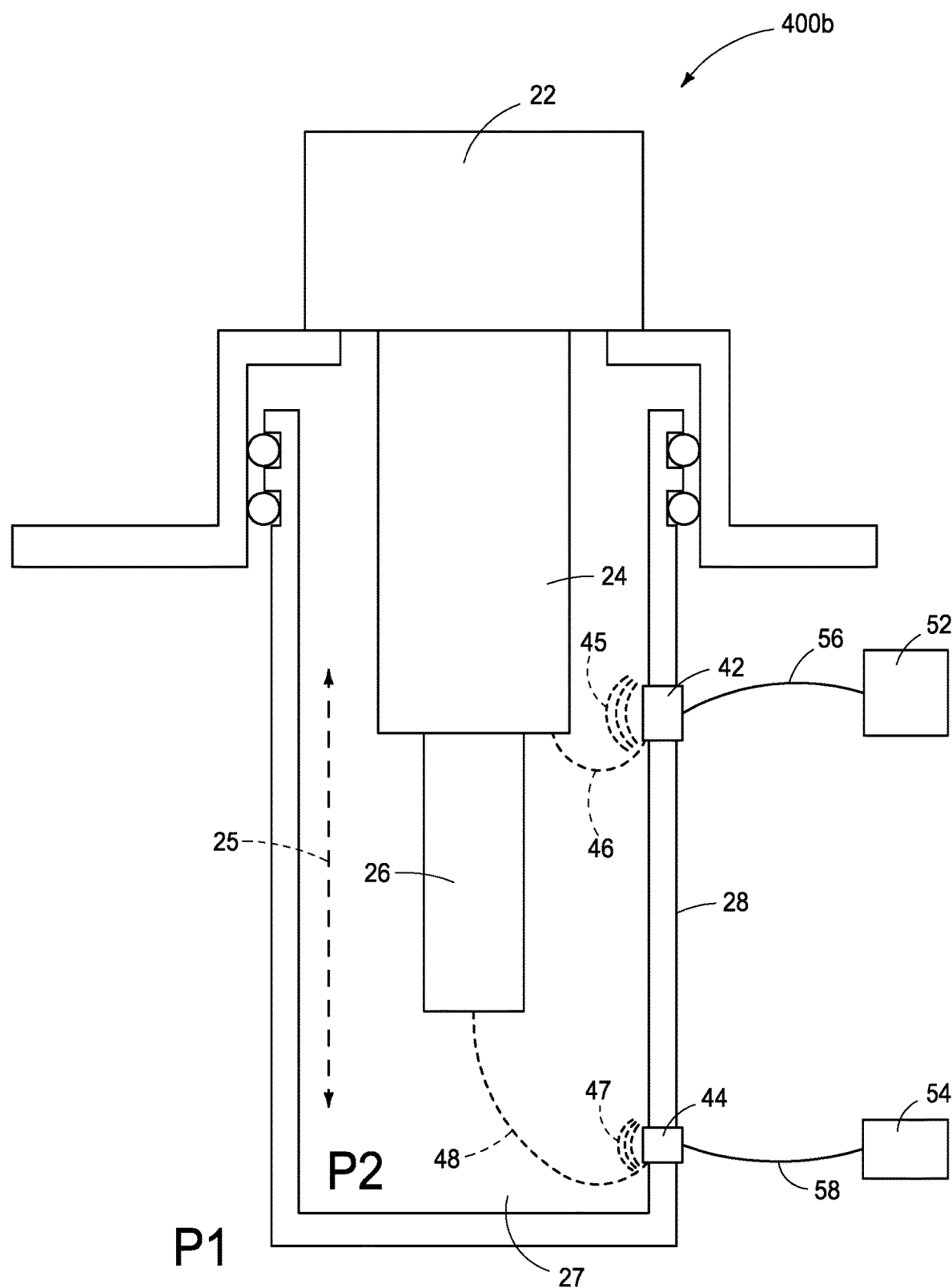
FIG. 11 is a cryocooler according to another embodiment of the disclosure.
Figure 12:
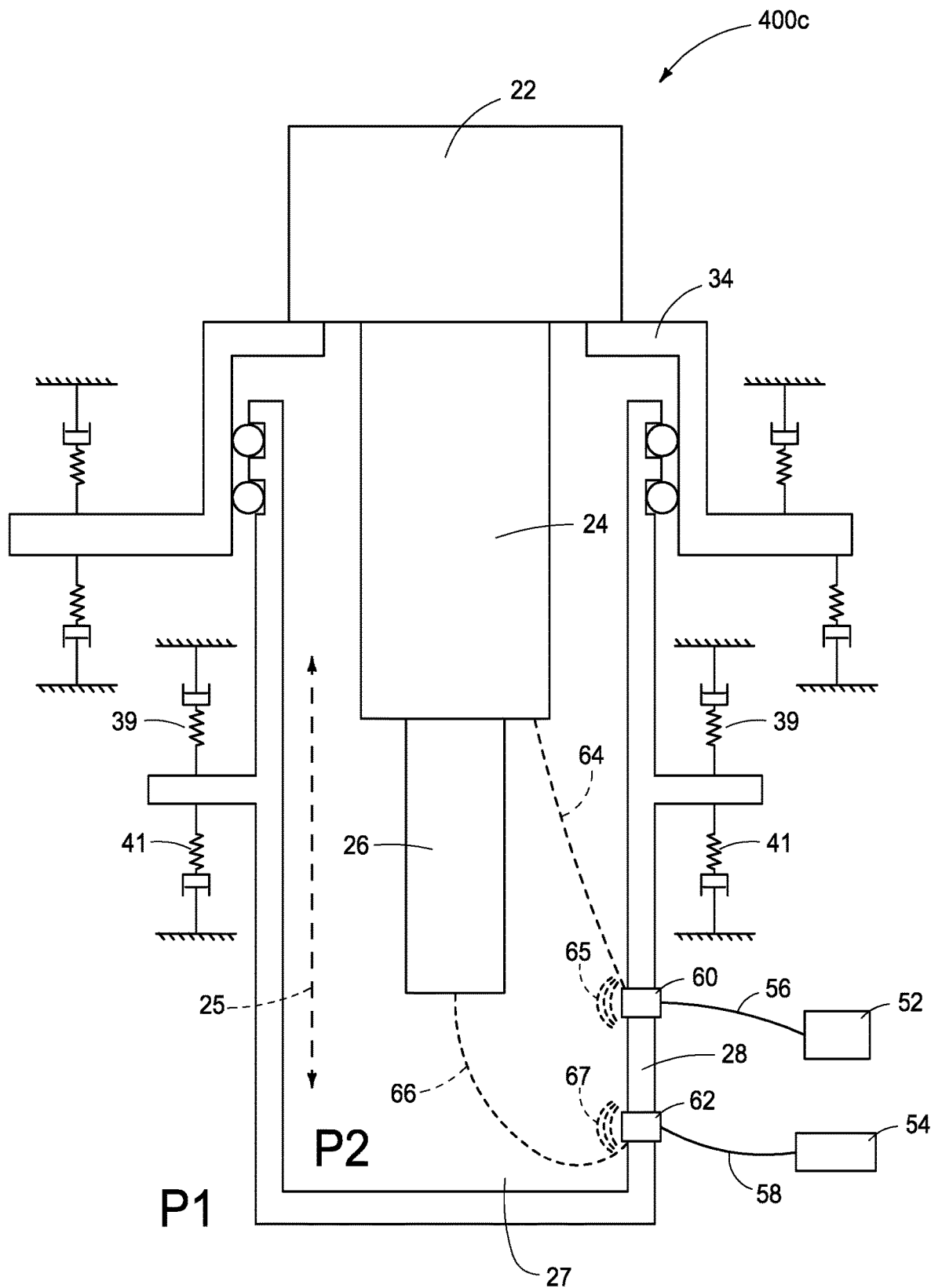
FIG. 12 is a cryocooler according to another embodiment of the disclosure.

Referring next to FIGS. 10-12, cryocooler assemblies 400a-b are shown providing at least some of the contemplated cryocooler configurations. Each cryocooler can include a coldhead 22 having operable stages 24 and 26, for example. About the coldhead and stages can be a housing 28 that defines a chamber 27. In accordance with example operations, within chamber 27 a temperature gradient 25 can exist. For example, at the lower most portion of the chamber a liquid form of the cryofluid can exist and this may have the lowest most temperature of the cryofluid within the chamber. As the gradient extends away from the lower most portion of the chamber, the cryofluid may exist as a gas/liquid or as a gas and these temperatures are different, (higher) than the temperature of the liquid at the lower most portion of the chamber.

In accordance with example implementations, thermally conductive masses, such as masses 42, 44, 60, and/or 62 can be thermally engaged with the cryofluid within the chamber. This thermal engagement can be convective, conductive, and/or a combination of both. For example, masses 42, 44, 60, and/or 62 can be thermally engaged via convections 45, 47, 65, and/or 67 respectively. Accordingly, these masses have the temperature of the cryofluid with which they are thermally engaged. In accordance with other embodiments, these masses may be conductively engaged with both the cryofluid and the coldhead via respective thermal links 46, 48, 64, and/or 66. These thermally conductive links and/or masses may be constructed of thermally conductive materials such as copper.

In accordance with example implementations, the masses can be arranged in relation to the cryofluid to maintain the masses at a desirable temperature for use as a cold source for discrete portions of a cryoanalytical device.

Particular embodiments of the cryocooler assemblies can include at least one thermal link extending from a coldhead 22 within chamber 27. Referring to FIG. 10, assembly 400a is shown that includes separate thermal links 46 and 48 extending from corresponding first and second stages 24 and 26 of coldhead 22 within chamber 27. While two links are depicted in this configuration, a single link from the coldhead is contemplated. As shown, specific portions of the coldhead can be in thermal connection with specific masses 42 and 44 via respective thermal links 46 and 48. In this particular embodiment, the spring and damper assemblies can be tuned to minimize vibrations transfer from the coldhead to mass 42 and mass 44. Again, this thermal communication can include, but is not limited to: flexible conductive lines; and/or conduction and/or convection through the cryofluid within chamber 27. The thermal links can allow for large relative motion between the masses 42 and 44 and the respective thermal connection points thus leading to an additional mechanical isolation. Masses 42 and 44 can also be suspended from coldhead stages 24 and 26 through a spring and damper assembly that is not depicted here, or mounted to housing 28 through a spring and damper assembly that is not depicted, but also contemplated.

Referring next to FIG. 11, assembly 400*b* is depicted that includes portions 42 and 44 of chamber housing 28. These portions can be thermally conductive while other portions of chamber housing 28 are insulative. In accordance with example implementations, thermal gradient 25 may exist in the cryofluid contained within the chamber 27 and the thermal masses 42 and 44 may be positioned at different heights, for example near the second stage 26 and/or first stage 24 of the coldhead for example, to utilize different temperatures along the temperature gradient of the fluid, and the associated cooling powers. Accordingly, thermal links 45 and 47 can provide cold source links as a liquid or gas thermal link between the contents of the chamber the proximate mass.

Referring next to FIG. 12, assembly 400*c* is depicted in accordance with another implementation, masses 52 and 54 are in thermal communication with thermally conductive portions 60 and 62 respectively via thermal links 56 and 58 These contacts are in thermal connection, via flexible conductive lines and/or conduction and/or convection through the cryofluid, with the coldhead via additional links 64 and 66 and/or convections 65 and 67. As shown, spring and damper assemblies 39 and 41 can be tuned to minimize vibrations transfer from the coldhead to mass 52 and mass 54. In accordance with example implementations, masses 52 and/or 54 can define portions of a cryoanalytical device utilizing and/or associated with the cryocooler assembly. For example, the portions of the cryo analytical device can include a radiation shield or a sample mounting surface or fixture.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A cryocooler assembly comprising:
a coldhead support structure configured to generate mechanical responses;
a housing about stages extending from the coldhead and slidably engaged with the coldhead support structure, wherein the stages are suspended from the coldhead support structure within the housing;
an assembly between the coldhead support structure and the housing, the assembly configured to allow movement of the coldhead support structure in relation to the housing and isolate the housing from the mechanical responses of the coldhead support structure; and
at least two spring and damper assemblies, individual ones of the spring and damper assemblies operatively extending from each of the coldhead support structure and the housing.

2. The cryocooler assembly of claim 1 wherein the coldhead support structure is mechanically coupled to one or both of a pump or motor.

3. The cryocooler assembly of claim 1 wherein the housing is configured as a chamber of the cryocooler.

4. The cryocooler assembly of claim 1 wherein the housing is received within the coldhead support structure.

5. The cryocooler assembly of claim 1 wherein the assembly comprises an O-ring.

6. The cryocooler assembly of claim 1 wherein the assembly comprises a pair of radial seal O-rings.

7. The cryocooler assembly of claim 1 wherein each of the spring and damper assemblies operatively engages another mass or a surface.

* * * * *